(12) United States Patent
Benedict et al.

(10) Patent No.: US 7,905,453 B2
(45) Date of Patent: Mar. 15, 2011

(54) PIGGYBACK EQUIPMENT PANEL PAYLOAD ARRANGEMENT, A DEVICE FOR AND METHOD OF ATTACHING A HOSTED SECONDARY PIGGYBACK PAYLOAD AND ADAPTER TO BE USED FOR A PIGGYBACK SECONDARY PAYLOAD ARRANGEMENT FOR LAUNCHING THE PIGGYBACK EQUIPMENT PANEL SECONDARY

(75) Inventors: Bryan Benedict, Long Beach, CA (US); Gerard Jansson, Bethesda, MD (US)

(73) Assignee: Intelsat, Washington, DC (US)

( * ) Notice: Subject to any disclaimer, the term of this patent is extended or adjusted under 35 U.S.C. 154(b) by 0 days.

(21) Appl. No.: 11/797,009

(22) Filed: Apr. 30, 2007

(65) Prior Publication Data
US 2008/0149777 A1    Jun. 26, 2008

Related U.S. Application Data

(60) Provisional application No. 60/876,146, filed on Dec. 21, 2006.

(51) Int. Cl.
*B64G 1/00* (2006.01)
(52) U.S. Cl. .............. 244/173.3; 244/173.1; 244/173.2; 244/172.4
(58) Field of Classification Search .............. 244/173.1, 244/173.2, 173.3, 172.4
See application file for complete search history.

(56) References Cited

U.S. PATENT DOCUMENTS

| | | | | |
|---|---|---|---|---|
| 3,380,687 A | * | 4/1968 | Ford et al. | 244/173.3 |
| 4,043,524 A | * | 8/1977 | Dreyer et al. | 244/118.1 |
| 4,664,343 A | * | 5/1987 | Lofts et al. | 244/171.1 |
| 4,896,848 A | * | 1/1990 | Ballard et al. | 244/171.3 |
| 5,199,672 A | * | 4/1993 | King et al. | 244/173.3 |
| 5,271,582 A | | 12/1993 | Perkins et al. | |
| 5,411,226 A | * | 5/1995 | Jones et al. | 244/173.3 |
| 5,884,866 A | * | 3/1999 | Steinmeyer et al. | 244/137.1 |
| 6,076,467 A | * | 6/2000 | Cespedosa et al. | 102/378 |
| 6,138,951 A | * | 10/2000 | Budris et al. | 244/173.3 |
| 6,227,493 B1 | * | 5/2001 | Holemans | 244/173.1 |
| 6,244,541 B1 | * | 6/2001 | Hubert | 244/173.2 |
| 6,286,787 B1 | * | 9/2001 | Fleeter | 244/158.5 |
| 6,290,182 B1 | * | 9/2001 | Grunditz | 244/173.1 |

(Continued)

FOREIGN PATENT DOCUMENTS

WO    92/00223 A1    1/1992

OTHER PUBLICATIONS

Orbital sciences Corporation, "Minotaur I User's Guide," Release 2.1, Jan. 2006 [Retrieved May 18, 2008] www.orbital.com/NewsInfo/Publications/Minotaur_Guide.pdf, p. 67-70.

(Continued)

*Primary Examiner* — Timothy D Collins
*Assistant Examiner* — Justin Benedik
(74) *Attorney, Agent, or Firm* — Sughrue Mion, PLLC

(57) ABSTRACT

The invention relates to piggyback secondary payloads, a device for and a method of attaching piggyback secondary payloads, including a primary satellite and at least one secondary payload, such as a deployable microsatellite, affixed instrument package or the like, wherein the secondary payload is mounted on the nadir end of the primary satellite, preferably employing a universal adapter between the primary satellite and the at least one secondary payload.

8 Claims, 5 Drawing Sheets

U.S. PATENT DOCUMENTS

| | | | |
|---|---|---|---|
| 6,296,206 B1 * | 10/2001 | Chamness et al. | 244/173.3 |
| 6,305,871 B1 * | 10/2001 | Lancho Doncel et al. | 403/286 |
| 6,390,416 B2 * | 5/2002 | Holemans | 244/173.3 |
| 6,416,018 B2 * | 7/2002 | DiVerde et al. | 244/137.1 |
| 6,494,406 B1 * | 12/2002 | Fukushima et al. | 244/173.3 |
| 6,494,407 B2 * | 12/2002 | Arulf | 244/173.1 |
| 6,523,783 B2 * | 2/2003 | Lounge et al. | 244/172.4 |
| 6,533,221 B1 * | 3/2003 | Hubert | 244/173.1 |
| 6,588,707 B1 * | 7/2003 | Hubert | 244/173.2 |
| 6,789,767 B2 * | 9/2004 | Mueller et al. | 244/173.3 |
| 7,093,805 B2 * | 8/2006 | Blackwell-Thompson et al. | 244/173.1 |
| 2002/0179775 A1 * | 12/2002 | Turner | 244/158 R |
| 2002/0179776 A1 * | 12/2002 | Mueller et al. | 244/158 R |
| 2005/0109878 A1 * | 5/2005 | Cruijssen et al. | 244/158 R |

OTHER PUBLICATIONS

Defense Advanced Research Projects Agency, Fact Sheet, DARPA, Mar. 2007, Orbital Express, pp. 1 and 2.

* cited by examiner

PIGGYBACK EQUIPMENT PANEL PAYLOAD ARRANGEMENT, A DEVICE FOR AND METHOD OF ATTACHING A HOSTED SECONDARY PIGGYBACK PAYLOAD AND ADAPTER TO BE USED FOR A PIGGYBACK SECONDARY PAYLOAD ARRANGEMENT FOR LAUNCHING THE PIGGYBACK EQUIPMENT PANEL SECONDARY

This Application claims priority from U.S. Provisional Application No. 60/876,146, the disclosure of which is incorporated herein by reference.

BACKGROUND OF THE INVENTION

1. Field of the Invention

The invention relates to a piggyback equipment panel, and a device for and a method of attaching the piggyback panel (which itself may contain multiple payloads) as a secondary payload. The affixed instrument package or the like, (as a secondary payload) is mounted on the nadir end of the primary satellite, preferably employing a universal adapter between the primary satellite and the hosted piggyback equipment panel (which contains at least one secondary payload).

2. Background of the Invention

In order to increase the number of payloads that can be flown with reduced costs, the concept of "hosted hardware" was developed, which infers that a parent spacecraft "host" is used as a platform on which the "hosted payload" can achieve access to space. The hosted payload may be a micro-satellite (subject of previous patent application) or a collection of sensors, electrical units and antenna. There are two primary ways to accomplish this task, integrating the payload into the parent satellite or integrating the payload onto the parent satellite. One approach to integrating the payload into the parent satellite involves "significant-integration," where the payload hardware is installed during the manufacturing of the primary/"parent" spacecraft. Units are mounted directly on internal equipment shelves and spacecraft subsystems are redesigned to accommodate the specific needs of the hosted hardware. An example of this approach is the GCCS FAA payload integrated on Intelsat's Galaxy 15 spacecraft manufactured at Orbital Sciences. The disadvantage of this approach is that the flight hardware must be available in time for the assembly and test of the parent spacecraft and the non-recurring costs are high due the spacecraft redesign which must be conducted. The hosted hardware rides on the parent satellite—utilizing the parent satellite bus for power, thermal control and orbital maintenance (attitude control (pointing), station keeping and momentum dumping).

The approach of mounting a hosted payload onto the parent spacecraft offers several advantages, including: little non-recurring work is required, hardware (such as a micro-satellite or equipment platform) can arrive later in the program, rework of the hosted payload is much easier and switch-out of one hosted payload for another is relatively simple. To this end, several standardized Multiple Payload Adapters (MPA's) have been developed to attach to existing payload for taking advantage of the excess payload capability on launch systems.

Key to achieving the goal of flexible and inexpensive access to space is the development of standardized adapter interface (ESPA, SIV, SET) as a standard part of the spacecraft generic design. This generic interface could be utilized for either carrying small satellites, carrying a hosted equipment panel, or (if required by the parent satellite communications subsystem) an antenna feed tower. One of the advantages of hosting a secondary payload on this generic interface is that if the microsat or equipment panel becomes unavailable, the parent satellite can be flown without the secondary payload (where electrical connectors caps and thermal blankets are used to close out the open nadir position). Since the equipment panel requirements include an envelope of acceptable mass properties, if the nadir location is depopulated late in the program, a dummy mass model need not be flown to maintain parent spacecraft mass properties limitations.

Thus, there is a need to reduce the cost and increase the ease and frequency of taking small payloads into orbit. Piggybacking a secondary payload onto the nadir of a parent/primary telecommunications satellites through the use of a standardized or universal adapter is an improved and novel method of achieving this task. Herein, the terms "primary payload" and "primary satellite" are used interchangeably, but the secondary payload may be a satellite, an instrument package, antenna cluster or the like.

Thus, it is an aspect of the present invention to overcome the problems and disadvantages of the prior art designs and methods.

It is yet another aspect of the present invention to provide a payload design that permits the use of a universal adapter for coupling together in an efficient and effective package at least one secondary payload to a primary satellite for launching the secondary payload in a certain orbit.

It is a further aspect of the present invention to provide an micro-adapter between the primary satellite and a secondary payload, which utilizes heritage/generic hardware to couple an equipment panel or antenna tower to the parent satellite nadir face (or in the case of a microsat secondary payload, also separate the microsatellite from the parent satellite at the appropriate time).

SUMMARY OF THE INVENTION

In view of the above, it is an aspect of the present invention for attaching piggyback satellite payload using an adapter for attaching at least one secondary payload to the nadir end of a primary satellite of a spacecraft that secures the secondary payload during launch.

An exemplary aspect of the present invention provides a piggyback micro-satellite arrangement including: a primary satellite having a nadir end; at least one secondary payload; and an adapter, wherein the secondary payload is affixed to the nadir end of the primary satellite by the adapter.

According to another aspect of the present invention, there is a method of attaching and taking to orbit hardware which does not separate from the parent spacecraft—for example a piggyback equipment panel (which had secondary payload hardware attached) or an antenna tower (where required for the operation of the parent spacecraft).

BRIEF DESCRIPTION OF THE DRAWINGS

The accompanying drawings, which are included to provide a further understanding of preferred exemplary embodiments of the present invention and are incorporated in and constitute a part of this specification, illustrate exemplary embodiments of the invention and together with the description serve to explain the principles of the drawings in which.

DETAILED DESCRIPTION OF THE EXEMPLARY EMBODIMENTS OF THE INVENTION

Figure 1:
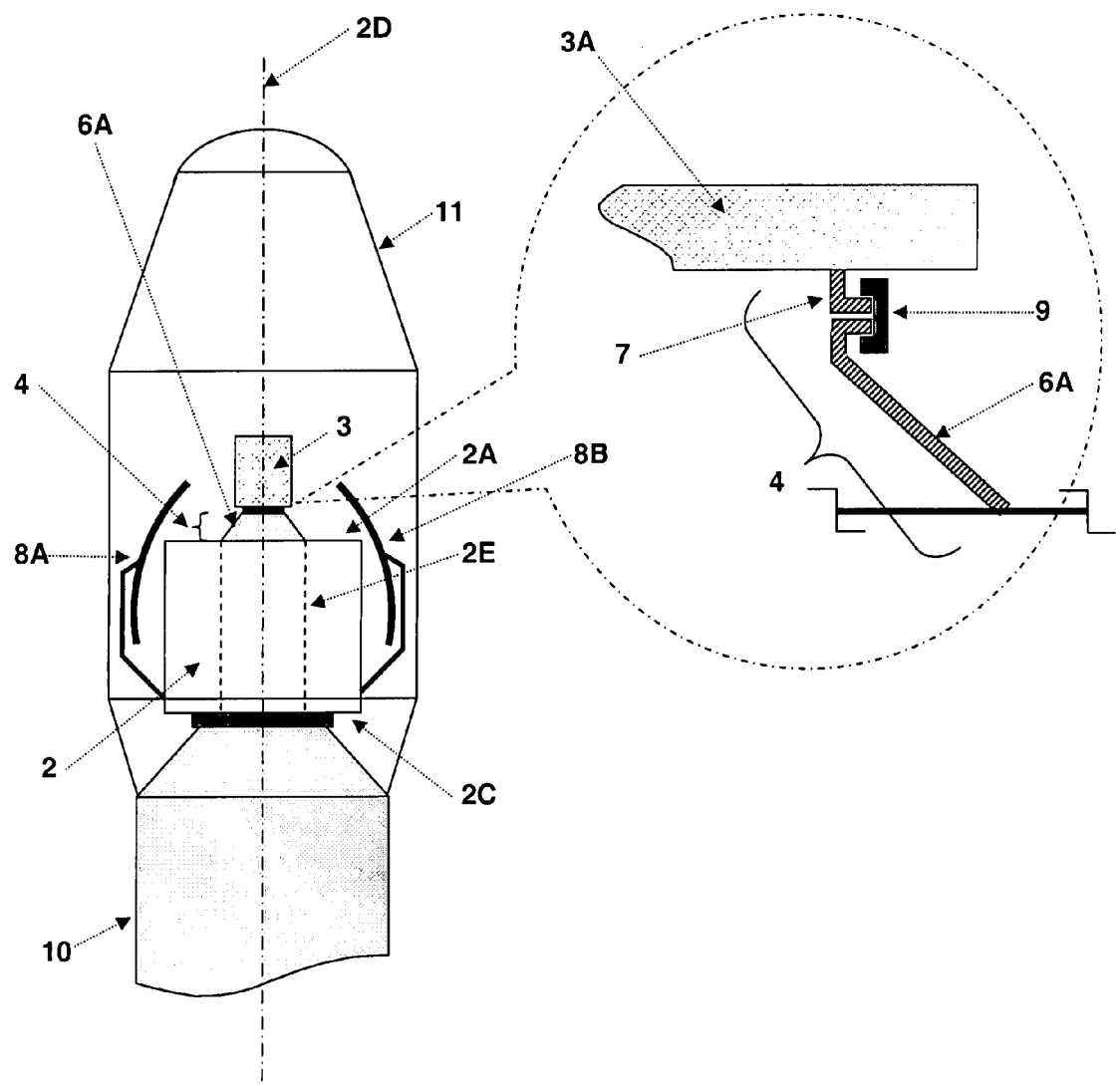
FIG. 1A is a schematic view of a piggyback payload arrangement, including a spacecraft (primary payload), a piggyback secondary payload, and adapter which includes a industry standard and compatible adapter cone and a clamp band according to the invention.
FIG. 1B is a schematic view of a an adaptor arrangement for clamping the secondary payload to the primary/parent satellite, including a clamp band coupling structure that clamps a first coupling structure to a second coupling structure.

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements.

An exemplary embodiment of a piggyback arrangement of a primary satellite and a secondary payload is illustrated in FIG. 1A. The figure illustrates a mated combination of a primary satellite 2 and a secondary payload 3, but the invention is not limited thereto, as will be apparent from the subsequent description of additional embodiments. In FIG. 1A, a launch vehicle 10, which typically is the upper stage of a multi-stage launch rocket and conventionally has a payload secured to its upper end, also has a releasable fairing 11 attached to its upper end to cover and protect the payload during launch. The payload, in accordance with an exemplary embodiment of the invention, is a piggyback arrangement of a primary satellite 2, and a secondary payload 3, where the secondary payload 3 is mounted to the nadir end 2A of the primary satellite 2. The primary satellite 2 has appropriate thrusters, engines or rockets (not shown) for maneuvering the primary satellite 2 into a desired geostationary orbit and maintaining the satellite in a desired geostationary orbit. The primary satellite at launch also may have deployable antennae 8A and 8B, deployable solar panels (shown stacked in launch configuration as "14" in FIG. 2) and a variety of control, and telemetry antennae 8C (FIGS. 2, 3, and 4) and power system components (not shown), as would be known to one skilled in the art.

In the exemplary embodiment illustrated in FIG. 1A, the primary satellite 2 has an apogee platform 2C that is transverse to a longitudinal axis of symmetry 2D. The primary satellite typically is constructed with a cylindrical longitudinal support cylinder or core 2E that provides strength and stability to the satellite and supports the various components and systems that conventionally comprise a satellite design, including control, telemetry, communication and power subsystems. The core 2E is constructed of light weight but rigid materials that can withstand longitudinal compressive forces and stresses, and provide torsion stability, especially after antenna and solar panel deployment. Such design conveniently permits support of relatively large masses at the nadir end of the primary satellite. As would be understood, however, the present invention is not limited to such structure, and any alternative-satellite design that permits support of a secondary payload mass at the nadir end of a primary satellite would be useable in implementing the principles of the present invention.

In the exemplary embodiment illustrated in FIG. 1A, the primary satellite 2 and the secondary payload 3 are coupled together by an adapter 4. The adapter 4 is mounted to the nadir end 2A of the primary satellite 2, supported directly or indirectly by the core 2E (also shown in FIG. 2) in the exemplary design, so that the stresses of the mass of the secondary payload 3 during launch and during separation after launch will be accommodated. The adaptor 4 may have any of a variety of designs that would permit convenient attachment to the nadir deck 2A of the primary satellite, and permit convenient attachment of a secondary payload 3 during piggyback payload assembly.

Figure 2:
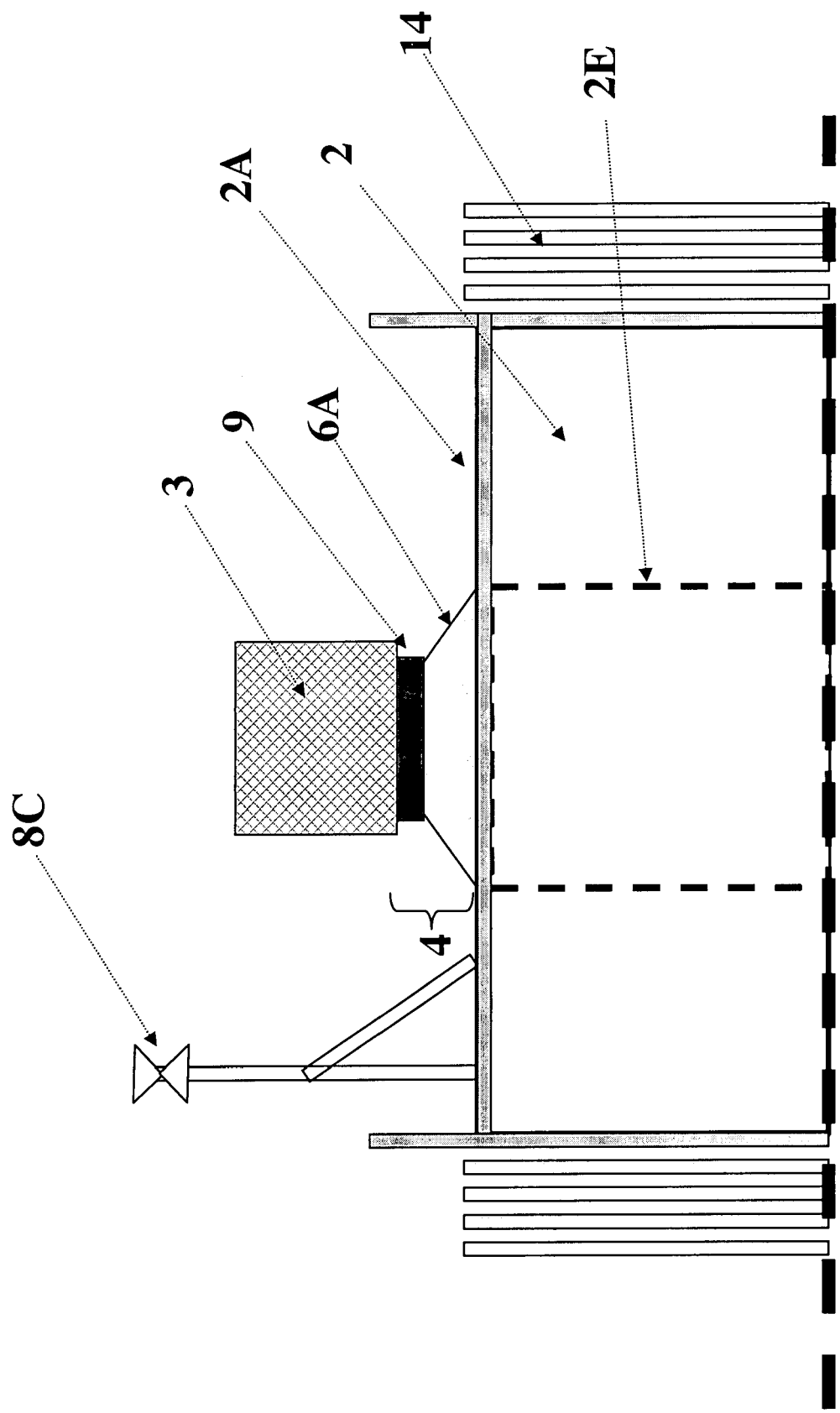
FIG. 2 is a schematic side view of a piggyback payload arrangement (90 degrees perspective rotation from FIG. 1A), comprising a primary payload, a second payload, central support cylinder, an adapter cone, and a clamp band according to the invention.
Figure 3:
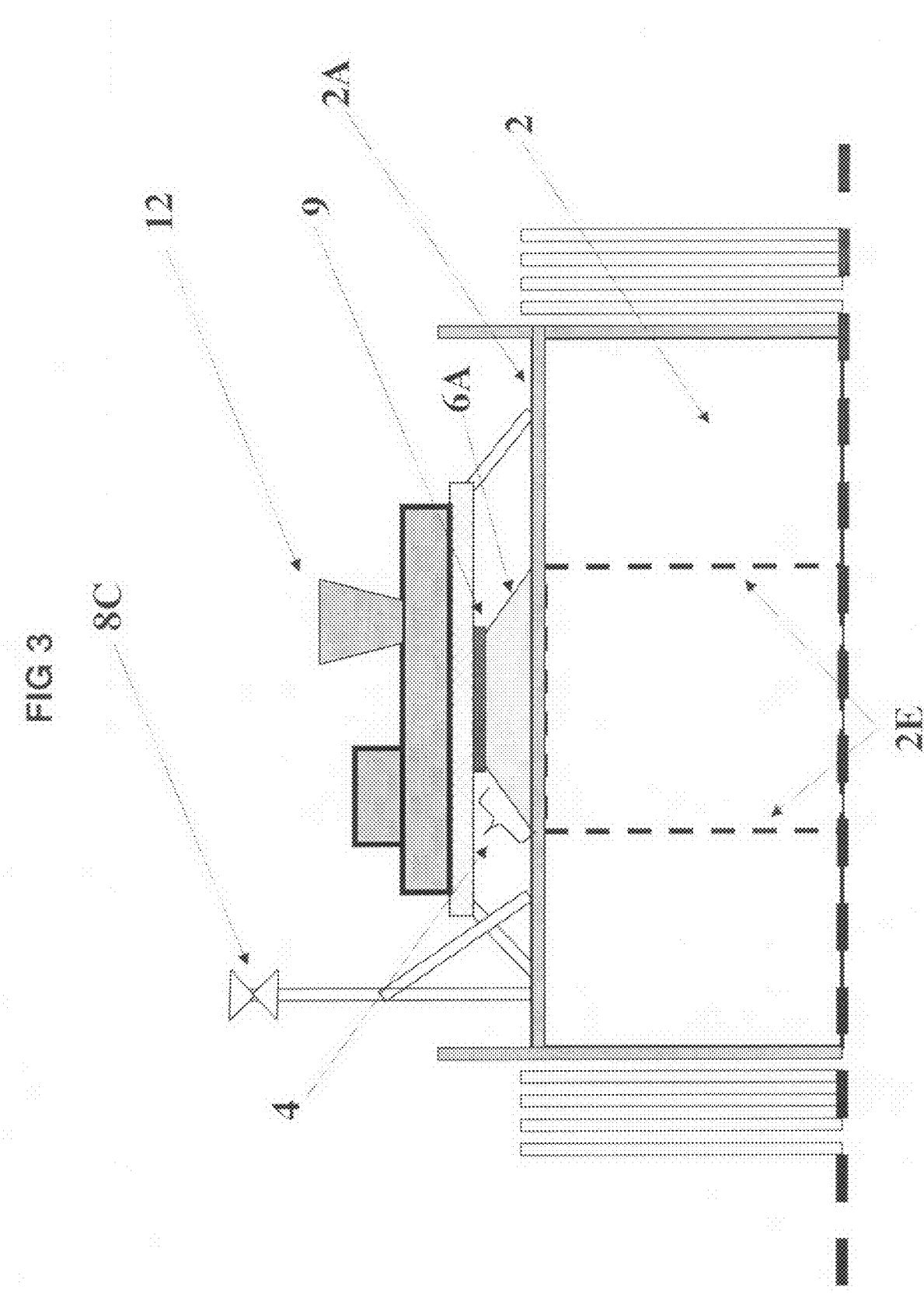
FIG. 3 is another schematic side view of a piggyback satellite arrangement, comprising a primary payload, a secondary instrument package and an adapter, according to the invention.
Figure 4:
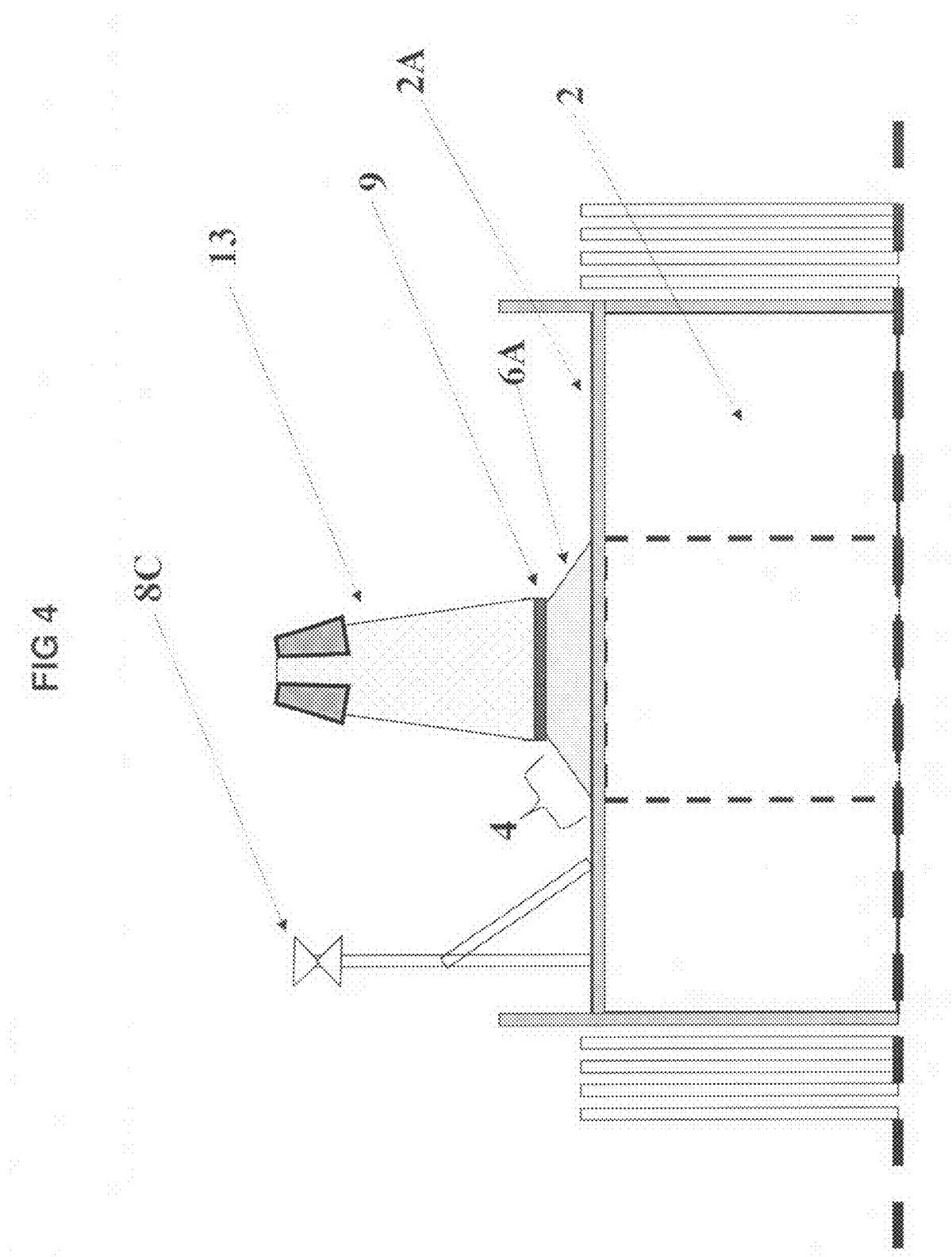
FIG. 4 is a schematic side view of the parent satellite and adaptor, where the standardized micro-satellite position on the adaptor has been replaced with an antenna tower (as may be required by the parent satellite when a secondary payload is not flown) according to the invention.

An exemplary embodiment of an adapter 4 is illustrated in FIG. 1B and includes a first coupling structure 6 that is attached to the primary satellite 2 and may be an "ESPA"-compatible adapter cone, or the like, that is designed to readily couple to the nadir end 2A of the primary satellite and to absorb shock and stresses during launch. Preferably, as also illustrated in FIGS. 2-4, the base 6A of the cone is coupled over the cylindrical core 2E of the primary spacecraft, or otherwise supported by longitudinal structures that can absorb stress and shock stemming from the mass of the secondary package during launch and/or deployment. A second coupling structure 7 is attached to the apogee end 3A of the second payload 3, which may be a microsat or instrument package platform coupling structure. A clamp band 9 provides a physical mechanical coupling (and release mechanism if the secondary payload is intended to be separated on orbit) between the secondary payload 3 and the top of the micro-adapter on the main payload nadir deck 2A. The clamp band 9 preferably is affixed over the interface of the first coupling structure 6 and the second coupling structure 7 for easy assembly of the piggy back payload. The clamp band 9 also may be readily released by remote control, so that a secondary payload satellite may be deployed in orbit, the secondary payload removed for repair or testing prior to launch, or an alternative secondary payload mounted to the primary satellite, if needed. If the secondary payload is not intended to be separated from the parent spacecraft, then the clamp band may not be fitted with a which is released remotely—rather a semi-permanent band could be utilized which can only be removed and installed manually prior to launch.

The adaptor 4 is a standalone mechanical system that, in an embodiment for a deployable secondary payload, consists largely of a clamp. The first coupling structure and the second coupling structure are held together with clamps (which can be released manually for secondary package removal). One type of clamp band system has clamps on an outer ring, held together by a tensioned wire, rod or strap, FIG. 1B, as an example, illustrates the first coupling structure 6A that is commonly known as the adapter cone that attached to a EELV Secondary Payload Adapter ring, referred to as "ESPA," which was conceived to take advantage of anticipated excess launch capacity on many of the DoD (Department of Defense) and commercial launches of the new large expendable launch vehicles, currently being built by Lockheed Martin and the Boeing Company. As shown in FIGS. 1A, 2, 3, and 4, the ESPA-compatible cone 6A is mounted to the central support structure of the primary satellite that is identical to EELV Standard Interface Plane (SIP). The ESPA adapter compatible cone is mounted to the nadir end of the primary satellite.

FIGS. 3 and 4 illustrates a payload system design of the primary spacecraft where the secondary payload may consist of but is not limited to at least one hosted instrument 12 and/or at least one antenna tower 13. Based upon qualified structure mass margins for current satellites the acceptable secondary payload mass around 150 kg or below but mass margins on other vehicles may likely be larger.

Communications to/from the second payload are typically through the communication capabilities of the primary spacecraft for efficiency and cost savings, although the secondary payload may have its own communications capability if desired. Where there is communication across the primary to secondary payload interface, there would be wires extending across the interface via detachable connectors. Wires from the connectors go to the applicable units on the main spacecraft. For example, telemetry from the second payload will be interleaved into the main spacecraft telemetry frames i.e., from the perspective of the primary satellite the second payload will just look like another "box/unit" on the main spacecraft. Commands to the second payload will also be treated by the primary satellite as another primary satellite "box/unit". It is also possible to interface to the second payload through the main spacecraft databus. Once again the second payload will be interfaced by the main satellite as if it were just a part of the main spacecraft. The secondary payload may also have a dedicated telemetry and command subsystem firewalled from the parent satellite for security reasons.

Both the primary satellite and the second payload will have an onboard battery for energy storage. In addition, the secondary payload can be powered either by taping into the primary satellite (through an electrical connector) or through umbilical to the ground. Umbilical power and communications connections between the secondary payload and primary satellite runs through one or more connectors which demate when the second payload moves away from the primary payload.

The secondary payload receives its own system test prior to mating with the primary spacecraft. The stand-alone secondary payload system test will include a battery of system tests which are run both before and after exposure of the secondary payload to various environments (i.e. thermal vacuum, sine vibration, acoustics, shock, etc).

In an optimum situation, the second payload is mated to the main spacecraft and verified operational both before and after main spacecraft mechanical environmental testing (sine vibe/acoustics/shock) and spacecraft thermal vacuum testing.

The mated piggyback system is then shipped to the launch site and retested both before and after mating to the launch vehicle upper stage. Since the testing of the second payload may be electronically through the primary payload, an augmented set of test procedures would be executed during the nominal main spacecraft checkout. Recall that from the point of view of the main spacecraft the secondary payload is treated like any other unit on the primary spacecraft.

On the launch pad the health status of both the primary satellite and secondary payload are continuously monitored until the final "go for launch" is given. During ascent it may not be possible to obtain spacecraft telemetry due to the fact that the RF path may not be adequate (usually because the spacecraft telemetry output is not able to be received). During ascent on the launch vehicle (orbit raising) the spacecraft telemetry may be able to be received although it is not required. At some point in the orbit raising sequence, sometimes following separation of the primary satellite from the upper stage of the launch vehicle, spacecraft telemetry is restored in an event known as "acquisition of signal" which requires a healthy spacecraft in the correct configuration within visibility of a correctly-configured ground station. In general, acquisition of signal occurs either just before of just after separation from the launch vehicle (assuming a global network of ground stations).

Provided that the secondary payload survives launch, the primary satellite relays the second payload health status telemetry.

Figure 5:
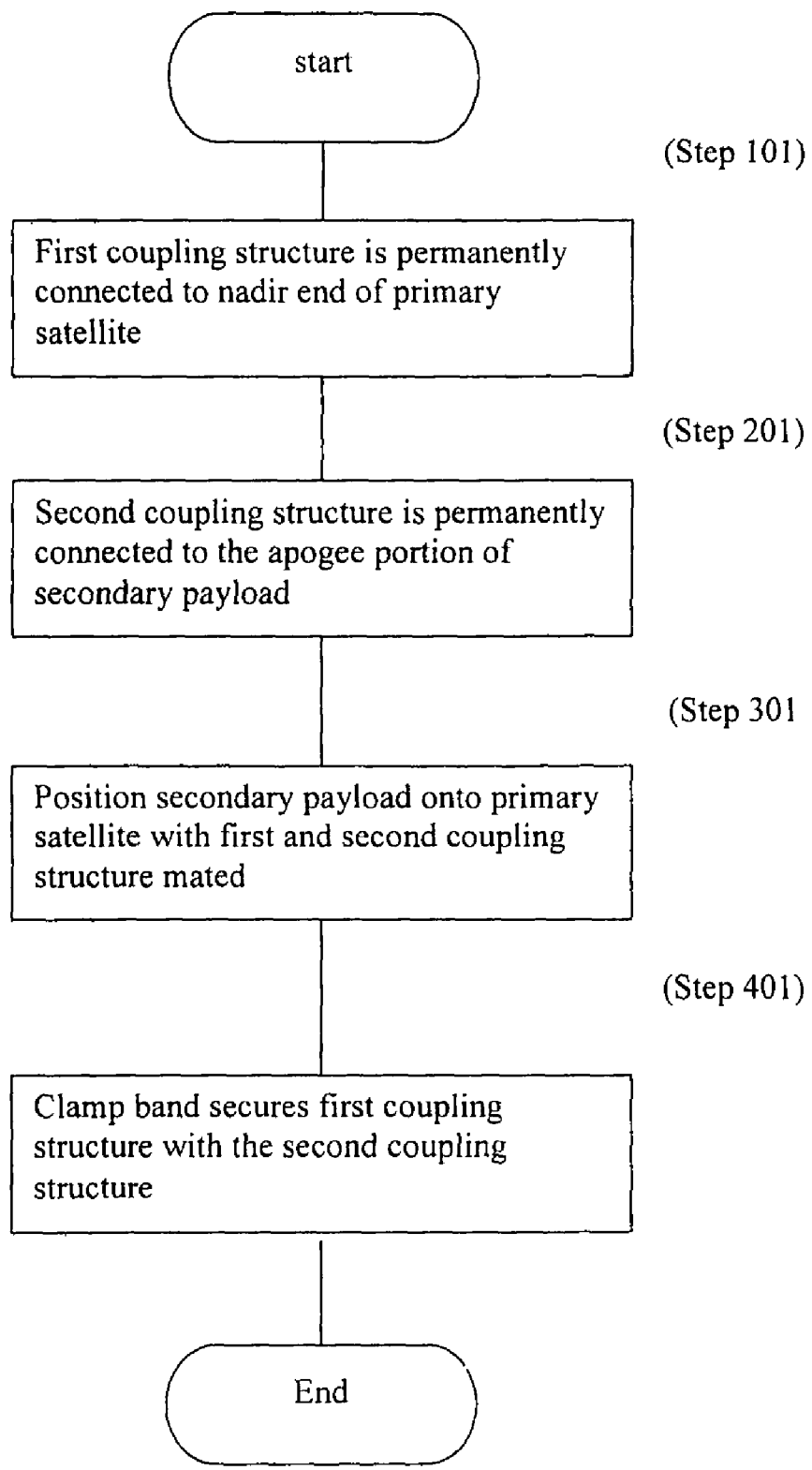
FIG. 5 is a flow chart illustrating the method of attaching piggyback satellite payload.

The assembly of the piggyback system will be described by a flow chart illustrated in FIG. 5.

First, a first coupling structure 6 is secured and permanently connected with the nadir end of the primary satellite by means of bolts or the like (step 101). Next, a second coupling structure 7 is secured and permanently connected to the apogee portion of the secondary payload by means of bolts or the like (step 201). Prior to coupling together the first coupling structure with the second coupling structure to form the adapter 4, the first coupling structure of the adapter 4 is mounted to the primary satellite 2. Either at the same time, or before or afterward of the attachment of the first coupling structure 6 of the adapter 4 is placed on the primary satellite 2, the second coupling structure 7 of the adapter 4 together with the second payload 3 is placed on the first coupling structure 6 of the adapter 4 in order to position the secondary payload onto primary satellite with the first and second coupling structure mated (step 301). After that, the second coupling structure 7 of the adapter 4 is clamped by the clamp band 9 to the first coupling structure of the adapter 4 in order to bring the same into the ready and pre-launch/permanent form (step 401) (as shown in FIGS. 1A, 1B, 2, 3, and 4). Securing of the second coupling structure 7 from the first coupling structure 6 occurs by means of the clamp band 9 (FIG. 1B) or other means known to the person skilled in the art. It is the intention that the securing between of the first coupling structure 6 and the second coupling structure 7 of the adapter 4 is to remain intact during launch and throughout spacecraft life It will be apparent to those skilled in the art that various modifications and variations can be made to the described preferred exemplary embodiments of the present invention without departing from the spirit or scope of the invention where in the present invention, the secondary payload is likely to be mounted on the nadir of the parent spacecraft. As a result launch loads and shock are attenuated through the parent spacecraft.

Also, it will be apparent to those skilled in the art that various modifications and variations can be made to the described preferred exemplary embodiments of the present invention without departing from the spirit or scope of the invention. Thus, it is intended that the present invention cover all modifications and variations of this invention consistent with the scope of the appended claims and their equivalents.

What is claimed is:
1. A piggyback satellite arrangement for launch from the earth surface by a launch vehicle, comprising:
   a primary satellite having a nadir end and an apogee end, deployable telecommunications antennae, deployable solar panels and a primary satellite propulsion system disposed at the apogee end and operative to lift the primary satellite into geostationary orbit after separation from the launch vehicle;

a plurality of secondary payloads, said plurality of secondary payloads comprising at least one secondary micro-satellite, each secondary payload having a mounted end and an axially opposite end; and a plurality of adapters, each comprising a first coupling structure affixed to the nadir end of the primary satellite and a second coupling structure affixed to the mounted end of the secondary payload, wherein each of the plurality of secondary payloads is affixed at its mounted end to the nadir end of the primary satellite by the adapters for release from the launch vehicle as a combined package, at least said adapter coupled to said secondary microsatellite being controllable for separation of the secondary micro-satellite from the primary satellite after being released from the launch vehicle as a combined package without the generation of space debris, and other of said plurality of adapters being operative to secure said secondary payloads to the primary satellite while in orbit.

2. The piggyback satellite arrangement as in claim 1, wherein the primary satellite comprises a substantially cylinder-shaped support structure extending from the nadir end to an apogee end of the primary satellite and being operative to provide strength and stability to the primary satellite parallel to a central axis.

3. The satellite arrangement device as in claim 1, wherein the adapter further comprises a clamp for coupling the first coupling structure to the second coupling structure.

4. The satellite arrangement device as in claim 1, wherein the at least one secondary payload further comprises: at least one of an instrument package, equipment panel, antenna system, and any combination thereof.

5. The satellite arrangement device as in claim 1, wherein the adapter further comprises an interface which may provide at least one of power, telemetry and command communications between the primary satellite and the secondary micro-satellite.

6. A method of assembling at least a primary satellite and a plurality of secondary payloads as a combined package arranged in a piggyback configuration with a launch vehicle operative to launch said combined package from the earth surface, the method comprising:

providing the primary satellite having a nadir end and an apogee end, said primary satellite being equipped with deployable telecommunications antennae, deployable solar panels and a primary satellite propulsion system at the apogee end that is operative to lift the primary satellite into geostationary orbit after separation from the launch vehicle, and being equipped with at least one first coupling structure, each said at least one first coupling structure mating to a respective one of a plurality of second coupling structures to form a releaseable adaptor that, when released in orbit, does not generate space debris;

providing a plurality of secondary payloads, including a secondary micro-satellite, each secondary payload having mountable end and being equipped with said second coupling structure, wherein each of said first coupling structures is disposed on the nadir end of the primary satellite and positioned for support by the primary satellite support structure, and each of the second coupling structure is disposed on the mountable end portion of the respective secondary payload, securing the first coupling structure to the second coupling structure prior to launch, thereby affixing the apogee end of the secondary payload to the nadir end of the primary satellite using the adapter and forming a combined launch package, and mounting the combined launch package into a single storage area of the launch vehicle for subsequent release from said vehicle as a combined launch package.

7. The method of assembling a piggyback secondary payload as recited in claim 6 further comprising: providing power to the secondary micro-satellite from the primary satellite via an interface in the adapter; and providing at least one of telemetry and command communication between the secondary micro-satellite and the primary satellite via an interface in the adapter.

8. The method of assembling a piggyback satellite with secondary payloads as in claim 6, further comprising affixing a plurality of secondary payloads onto the nadir end of the primary satellite using plural adapters.

\* \* \* \* \*